United States Patent [19]

Sonberg

[11] 3,710,361

[45] Jan. 9, 1973

[54] BIDIRECTIONAL DIGITAL DESKEW CIRCUIT

[75] Inventor: Charles M. Sonberg, Santa Monica, Calif.

[73] Assignee: Ampex Corporation, Redwood City, Calif.

[22] Filed: July 29, 1971

[21] Appl. No.: 167,402

[52] U.S. Cl. ....................340/174.1 B

[51] Int. Cl. ....................G11b 5/44

[58] Field of Search ....................340/174.1 B, 174.1 H; 179/100.2 MD

[56] References Cited

UNITED STATES PATENTS

| | | | |
|---|---|---|---|
| 3,263,223 | 7/1966 | Zenzefilis | 340/174.1 B |
| 3,349,383 | 10/1967 | Chur | 340/174.1 B |
| 3,562,723 | 2/1971 | Behr et al. | 340/174.1 B |

*Primary Examiner*—Vincent P. Canney
*Attorney*—Robert G. Clay

[57] ABSTRACT

A bidirectional magnetic information storage system includes a multi-channel read head, associated deskew compensated read circuitry, a multi-channel write head and deskew compensated write circuitry. Only one read and one write deskew circuit is required for each channel. Each digital, bidirectional circuit includes a one shot multivibrator providing a time delay determined by the time required for a capacitor to reach a selected trigger voltage as it charges through a potentiometer. When the potentiometer resistance on one side of the center tap is adjusted to provide a proper time delay for one direction of motion, the resistance on the opposite side of the center tap automatically provides the proper time delay for the reverse direction of motion without further adjustment.

14 Claims, 3 Drawing Figures

PATENTED JAN 9 1973 3,710,361

SHEET 1 OF 2

INVENTOR.
CHARLES M. SONBERG
BY Fraser and Bogucki
ATTORNEYS

INVENTOR.
CHARLES M. SONBERG
BY Fraser and Bogucki
ATTORNEYS

BIDIRECTIONAL DIGITAL DESKEW CIRCUIT

BACKGROUND OF THE INVENTION

1. Field of the Invention

This invention relates to magnetic information storage systems and more particularly to a magnetic tape transport with bidirectional digital deskew circuits.

2. History of the Prior Art

Magnetic information storage systems such as magnetic tape transports use multi-channel transducer heads having relative motion with respect to an adjacent magnetic medium. In order to facilitate interchangeability of a tape between different tape transports, it is desirable that each bit of a character written on tape be precisely located along a line perpendicular to tape motion. However, each bit is written by a different channel and these channels vary somewhat from the desired perpendicular straight line due to variations during manufacture and alignment. Thus, time delays are needed for channels located "downstream" from other channels to delay a write signal until the portion of a magnetic tape upon which a character is to be written reaches the "downstream" channels.

Similarly, gap scatter and deskew problems occur with respect to the multi-channel read head. Even though a character is written on magnetic tape along a perpendicular line, that line will reach the "upstream" channels before it reaches the "downstream" channels. In order for the signals from all channels to reach a data processor simultaneously, the signals from the "upstream" channels must be delayed for a short time.

One shot multivibrators have long been used to provide the necessary delay times. However, such circuits must be separately provided for each head for each channel and separately adjusted for each direction of operation. Thus, a nine-channel tape transport which reads and writes in both directions would require 18 separate one shot deskew circuits and 36 separate adjustments. The man hours required solely for adjusting the time delays can be quite substantial.

It has been recognized, however, that a single adjustment per channel will suffice for both directions of operation if the sum of the time delays for both directions is maintained constant. It is only necessary that the relative time delays between channels be maintained constant and that they be reversed as the direction of tape motion is reversed. A delay line arrangement using this constant sum technique is disclosed in U.S. Pat. No. 3,275,990, by Mendenhall et al, entitled "Signal Coupling Systems For Digital Reproducing Systems," issued Sept. 27, 1966, and assigned to the assignee of this invention. It is desirable, however, to have a digital time delay arrangement for many applications.

SUMMARY OF THE INVENTION

A magnetic information storage system includes read and write heads and associated electronics having bidirectional digital deskew circuits. The electronics for each channel includes a deskew circuit providing a constant total time delay which is apportioned between the two directions of motion. The arrangement maintains the advantages of a digital system while compensating for both directions of motion with a single adjustment for each channel.

BRIEF DESCRIPTION OF THE DRAWINGS

A better understanding of the invention may be had from a consideration of the following detailed description, taken in conjunction with the accompanying drawings, in which.

DETAILED DESCRIPTION

A multi-channel information storage system in accordance with the invention is exemplified as a digital magnetic tape transport having therein bidirectional digital deskew circuits for each channel. By maintaining the total of the delays in the forward and reverse directions constant for each channel, proper deskew for both directions of motion can be attained with a single adjustment.

Figure 1:
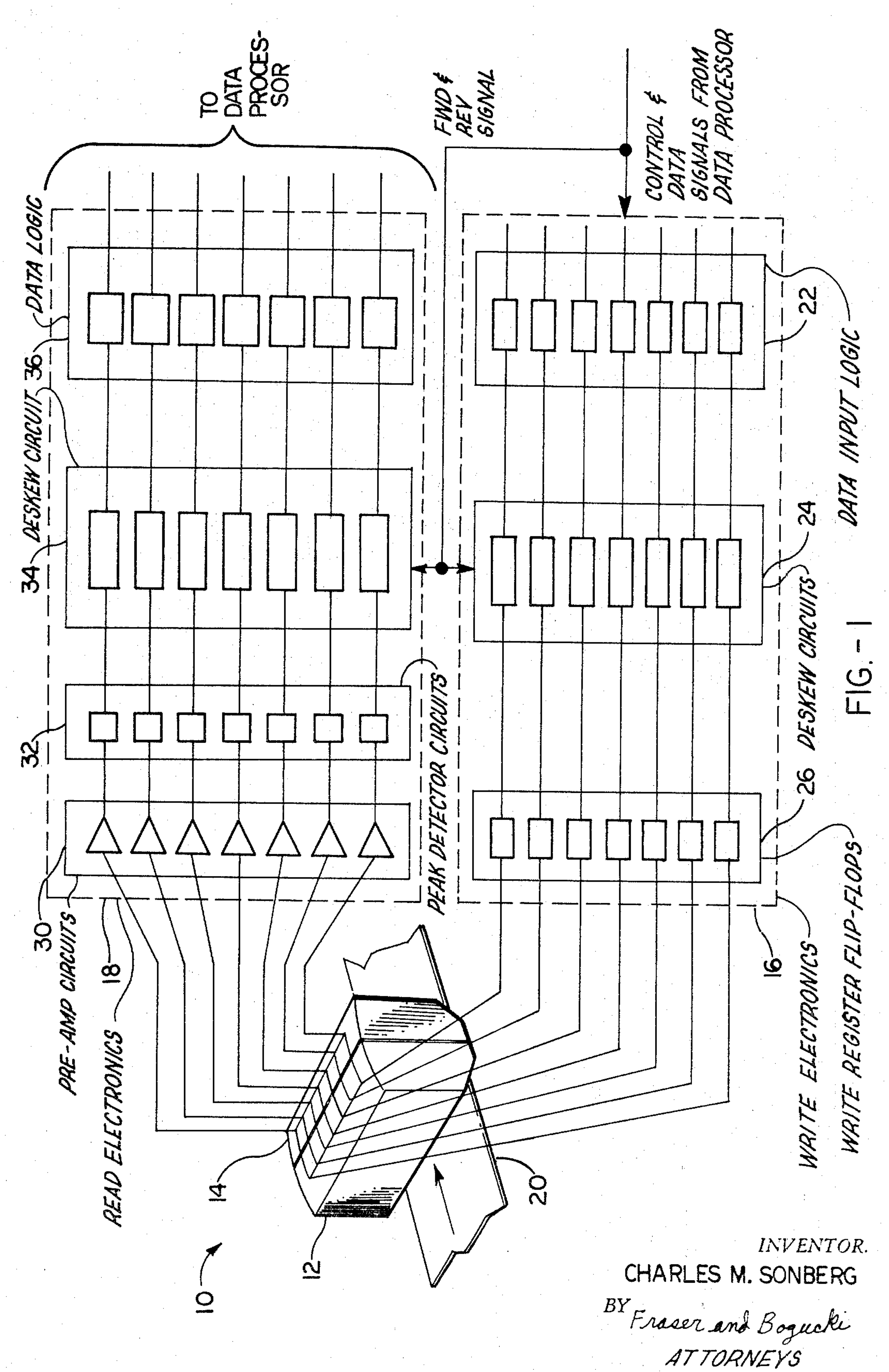
FIG. 1 is a schematic and block diagram representation of an information storage system in accordance with the invention.

As shown in FIG. 1, a digital magnetic tape transport 10 in accordance with the invention includes a write head 12, a read head 14, write electronics 16 and read electronics 18. The transducer heads 12, 14 each have seven parallel channels which are disposed adjacent a magnetic tape 20 movable with respect thereto.

The write electronics 16 provides a series of identical parallel circuits for each channel. These circuits include data input logic 22, deskew circuits 24 and write register flip-flops 26. The data input logic 22 receives control signals and data signals for each channel from an associated data processor (not shown). The data signals are delayed a selected period of time by deskew circuits 24 before controlling the states of the write register flip-flops 26. These flip-flops are connected in a conventional manner to control the write current through the various channels of the write head 12. In this manner, the data received from the associated data processor is written on tape with a precisely controlled time relationship.

The read electronics 18 also provides a series of identical parallel circuits for each channel. These include pre-amplifier circuits 30, peak detector circuits 32, deskew circuits 34, and data logic circuits 36. The pre-amplifier circuits 30 receive data information signals for each channel directly from the read head 14 and amplify them to a useable level. The peak detector circuits 32 receive the amplified information signals and provide input signals to the deskew circuits 34 indicating the center of transitions of magnetic states on the magnetic tape 20. The deskew circuits 34 transfer these input signals to the data logic 36 following time delays selected to cause all bits of a data character to be transferred to the data logic 36 substantially simultaneously. The data logic 36 provides interfacing between the tape transport 10 and an associated digital device in a conventional manner.

Figure 2:
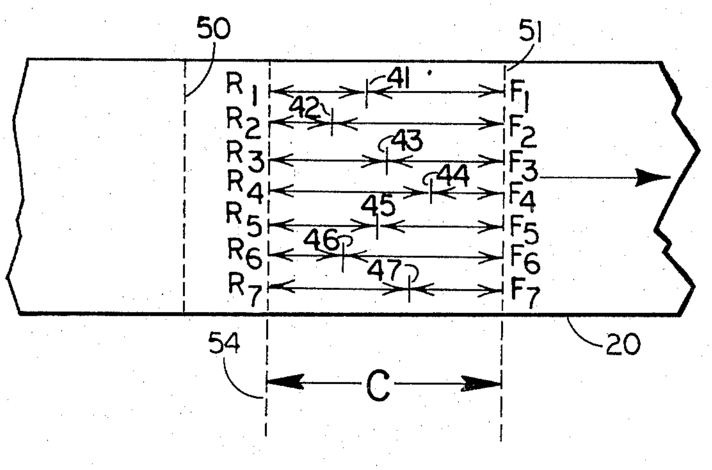
FIG. 2 is an illustration of a section of magnetic tape with the read gaps of a multi-channel read head superimposed thereon illustrating the constant sum bidirectional deskew technique in accordance with the invention.

The timing relationships of the read deskew circuits 34 are described in conjunction with FIG. 2 which shows read gaps 41–47 for channels 1–7, respectively positioned adjacent the magnetic tape 20. If the read gaps represent the position of the tape at which each channel reads a data character represented by dashed line 50, and dashed line 51 represents the point at which information is to be transferred from the deskew circuits 34 to the data logic 36, then the lines $F_1 - F_7$ represent the distance the tape must travel between reading and output from the deskew circuits. For a constant tape velocity, the lines $F_1 - F_7$ can be considered time intervals. Similarly, the lines $R_1 - R_7$ can be considered to represent the time intervals between data detection and transfer to the data logic 36 as a data character 50 passes the position represented by dashed line 54 when the tape 20 is moving in the reverse direction. It can thus be seen if the sum of the forward and reverse time delays for each channel equals a constant, C, the proper adjustment of a channel time delay for one direction constrains the time delay for the opposite direction to be properly adjusted also.

Although the use of constant sum time delays has been described only in conjunction with the read head 14, it will be appreciated that the same principles apply in conjunction with the write head 12.

Figure 3:
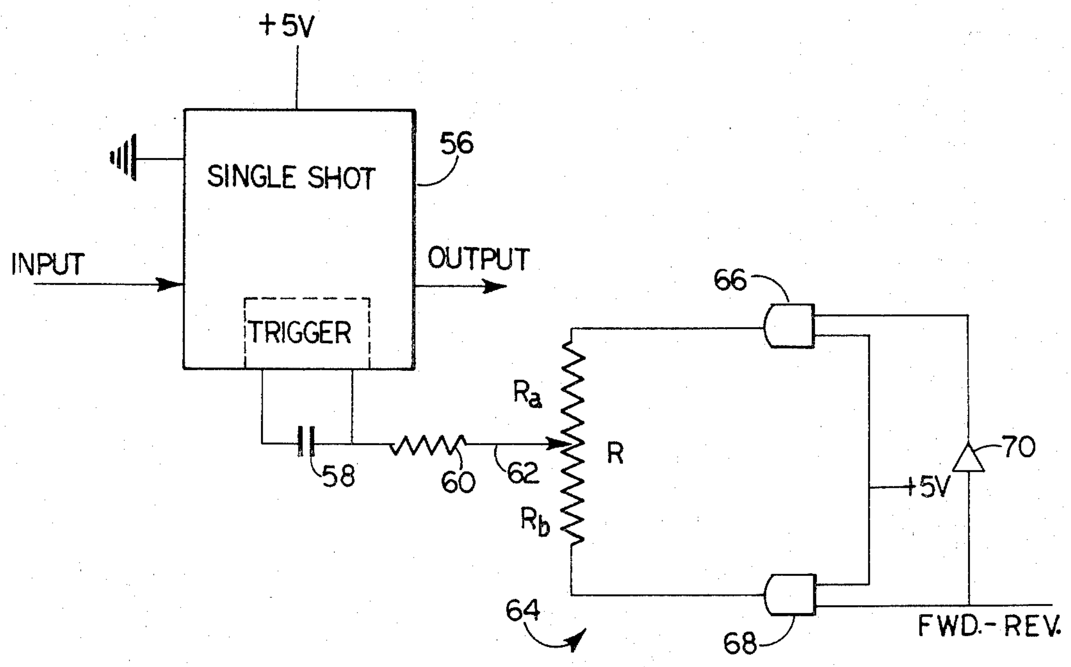
FIG. 3 is a schematic and block diagram representation of a bidirectional digital deskew circuit used in the information storage system shown in FIG. 1.

As illustrated in FIG. 3, a digital bidirectional deskew circuit in accordance with the invention includes a grounded single shot 56 having an input, an output, a 5-volt power supply voltage and a pair of trigger terminals. A capacitor 58 having capacitance C is connected between the trigger terminals, one of which is connected to one terminal of a resistor 60 having resistance R2. The other terminal of the resistor 60 is connected to a center tap 62 of potentiometer 64 having resistances R*a* and R*b* on opposite sides of the center tape 62. The Ra side of the potentiometer receives a supply voltage through AND gate 66 and the R*b* side of potentiometer 64 receives the supply voltage through AND gate 68. AND gate 66 is enabled or disabled by a forward-reverse signal inverted by inverter 70 while AND gate 68 is directly enabled or disabled by the forward-reverse signal.

The single shot 56 may be an integrated circuit model SN 74121N manufactured by Texas Instruments. If this integrated circuit is used, pins 3, 4 and 7 are grounded, pin 5 receives the input, pin 6 supplies the output, pin 14 receives a 5-volt supply, and the capacitor 58 is connected between pins 10 and 11 with pin 11 further connected to resistor 60.

As long as the triggering voltage is much less than 5 volts, the charge rate of capacitor 58 will be substantially constant at $1/C\ (R_2+Ra)$ in the forward direction and $1/C\ (R_2+Rb)$ in the reverse direction. Thus, the time delays are $T_f = V_{trigger}(C)\ (R_2+Ra)$ for the forward direction and $T_r = V_{trigger}(C)\ (R_2+Rb)$ for the reverse direction. It can thus be seen that the sum of the forward and reverse time delays $T_f+T_r = V_{trigger}(C)\ (2R_2+Ra+Rb)$ is constant where $Ra+Rb$ is equal to a constant, $R$.

Although there has been described above a specific arrangement of a magnetic information storage system with bidirectional digital deskew circuits in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention.

What is claimed is:

1. A bidirectional information storage system comprising: head means for transferring multi-channel information between said head means and a magnetic medium disposed adjacent said head means in movable relationship thereto, multi-channel write electronics connected to drive said head means in response to control and data signals, and multichannel read electronics connected to output data signals in response to information received from said head means, the electronics of each read and write channel including therein a bidirectional digital delay circuit connected to delay the data signal a selected one of two adjustable delay times, the sum of said delay times being constant and both of said delay times being adjustable by a single operation, said delay circuit including bistable means coupled to be set in response to the data signal and to be reset upon termination of one of the delay times.

2. The invention as set forth in claim 1 above, wherein the bistable means includes a digital single shot which sets upon receipt of an input signal and resets upon receipt of a reset signal of sufficient magnitude, and means for providing a reset signal of sufficient magnitude to the single shot after a selected one of said two adjustable delay times.

3. The invention as set forth in claim 2 above, wherein said reset signal attains a sufficient magnitude by charging a capacitor at a controlled rate.

4. The invention as set forth in claim 3 above, wherein said information storage system is a digital magnetic tape transport.

5. A bidirectional information storage system comprising:

head means for transferring multi-channel information between said head means and a magnetic medium disposed adjacent said head means in movable relationship thereto; and multi-channel read electronics connected to provide data signals in response to information received from said head means, the electronics of each channel including therein a bidirectional digital delay circuit connected to delay the data signal a selected one of two adjustable delay times, the sum of said delay times being constant and both of said delay times being adjustable by a single manual operation, the delay circuit including bistable means which is set in response to the data and which is reset upon termination of one of the delay times as determined by the direction of motion of the magnetic medium with respect to the head means, the resetting of the bistable means providing the data as delayed by said one of the delay times.

6. The invention as set forth in claim 5 above, wherein each of said delay circuits includes a digital single shot which sets upon receipt of an input signal and resets upon receipt of a reset signal of sufficient magnitude, and means for providing a reset signal of sufficient magnitude to the single shot after a selected one of said two adjustable delay times.

7. The invention as set forth in claim 6 above, wherein said information storage system is a digital magnetic tape recorder and wherein said reset signal attains a sufficient magnitude by charging a capacitor at a controlled rate.

8. A bidirectional information storage system comprising:

head means for transferring multi-channel information between said head means and a magnetic medium disposed adjacent said head means in movable relationship thereto; and multi-channel write electronics connected to drive said head means in response to control and data signals, each channel of said write electronics including therein a bidirectional digital delay circuit having a bistable circuit connected to delay the data signal a selected one of two adjustable delay times determined by the direction of motion of the magnetic medium relative to the head means, the sum of said delay times being constant and both of said delay times being adjustable by a single manual operation.

9. The invention as set forth in claim 8 above, wherein each of said delay circuits includes a digital single shot which sets upon receipt of an input signal and resets upon receipt of a reset signal of sufficient magnitude, and means for providing a reset signal of sufficient magnitude to the single shot after the selected delay time.

10. The invention as set forth in claim 9 above, wherein said information storage system is a digital magnetic tape transport and wherein said reset signal attains sufficient magnitude by charging a capacitor at a controlled rate.

11. For use in an information storage system, a bidirectional digital delay circuit having two selectable delay times comprising:

a digital single shot delaying an input signal until receipt of a trigger signal, and means for providing a trigger signal after a selected one of two adjustable time delays following receipt of the input signal, the adjustable time delay being selected in accordance with direction of operation of a record member relative to a transducer within the storage system, said time delays being adjustable by a single manual operation and having a constant sum.

12. The invention as set forth in claim 11 above, wherein said trigger signal is generated by charging a capacitor through a selected one of two resistances.

13. The invention as set forth in claim 12 above, wherein said two resistances include the resistance on opposite sides of an adjustable center tap of a potentiometer.

14. The invention as set forth in claim 13 above, further including means for selecting the resistance on one of said sides of the center tap for charging the capacitor therethrough.

* * * * *